No. 731,152. Patented June 16, 1903.

UNITED STATES PATENT OFFICE.

WILLIAM J. ARMBRUSTER, OF ST. LOUIS, MISSOURI.

PROCESS OF MAKING PIGMENTS.

SPECIFICATION forming part of Letters Patent No. 731,152, dated June 16, 1903.

Application filed August 25, 1902. Serial No. 120,997. (No specimens.)

*To all whom it may concern:*

Be it known that I, WILLIAM J. ARMBRUSTER, a citizen of the United States, residing at St. Louis, State of Missouri, have invented certain new and useful Improvements in Processes of Making Pigments, of which the following is a specification.

My invention has relation to improvements in processes of making pigments; and it consists in the novel series of steps more fully set forth in the specification and pointed out in the claims.

The composition in the present instance consists of an intimate mixture of precipitated zinc hydrate, barium sulfate, and barium carbonate, the zinc and barium precipitates being formed either consecutively or simultaneously, according to the character of the soluble barium salt used as reagent, as will more fully hereinafter appear. The present process contemplates the formation of the precipitates aforesaid from solutions of zinc sulfate, (or a mixture of zinc sulfate and zinc chlorid,) the hydrate of an alkali metal, barium salts, and the carbonates of the alkali metals.

As an illustration of the general principle here enunciated I prepare one molecular equivalent of an aqueous solution of zinc sulfate, to which I add two equivalents of sodium hydrate. The result of the mixture is a precipitate of one equivalent of zinc hydrate and a solution of one equivalent of sodium sulfate. To the latter is added one equivalent of sodium carbonate and two equivalents of barium sulfid, when there is precipitated on top of the zinc hydrate one equivalent of barium sulfate and one equivalent of barium carbonate, leaving two equivalents of sodium sulfid in solution. This condition may be expressed by the following reactions:

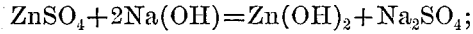
$$ZnSO_4 + 2Na(OH) = Zn(OH)_2 + Na_2SO_4;$$

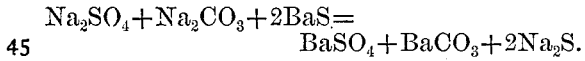
$$Na_2SO_4 + Na_2CO_3 + 2BaS = BaSO_4 + BaCO_3 + 2Na_2S.$$

The sodium sulfid remaining in solution is separated from the precipitates and can be recovered by any suitable means of evaporation to a crystalline condition. The precipitates are then thoroughly mixed by any suitable means of stirring, washed, and the superfluous water drained or filter-pressed away. Should it be desirable to calcine the mixture, and thus convert the zinc hydrate to an oxid, (ZnO,) this may be done by any of the means well known in the art.

Invoking, as I may, the doctrine of chemical equivalents, it follows that I can substitute for the sodium hydrate the hydrates of the other alkali metals. So, also, can other soluble salts of barium be substituted for the sulfid of barium without departing from the nature or spirit of my invention, it being borne in mind, however, that for practical reasons the base of the carbonate added should be the same as the base of the hydrate used. For instance, when sodium hydrate is used sodium carbonate should also be used; when potassium hydrate is used potassium carbonate should also be used; otherwise if the hydrate and carbonate bases were different the resulting sulfid solution would be a mixture of different bases.

It will be observed from the foregoing reactions that the barium sulfid is not added until after the precipitation of the zinc as hydrate. This order is necessary, owing to the danger of precipitation of the zinc as sulfid were the barium sulfid added simultaneously with the alkali hydrate, a consequence which would be inevitable, owing to the affinity between sulfur and zinc. If, however, we employ a different soluble salt of barium as the reagent, it may be added simultaneously with the alkali hydrate, thus precipitating all the constituents of my composition at the same time. As an illustration I employ a solution of barium chlorid, the precipitates being formed simultaneously according to the following reaction:

$$ZnSO_4 + 2Na(OH) + Na_2CO_3 + 2BaCl_2 = Zn(OH)_2 + BaSO_4 + BaCO_3 + 4NaCl,$$

the resulting solution being chlorid of sodium. If barium nitrate or acetate is used, the final solution will be sodium nitrate or acetate, as is obvious.

In the foregoing the mixed precipitate formed contains but a single equivalent of zinc hydrate; but should it be desirable to produce a pigment containing two such equivalents this may be accomplished by adding one equivalent of zinc chlorid to the zinc sulfate (thus making two equivalents of zinc salt) and using four equivalents of alkali hydrate and two equivalents of barium-salt solution, preferably in the form of chlorid, according to the following reaction:

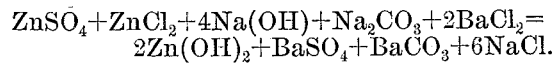
$$ZnSO_4 + ZnCl_2 + 4Na(OH) + Na_2CO_3 + 2BaCl_2 = 2Zn(OH)_2 + BaSO_4 + BaCO_3 + 6NaCl.$$

If zinc acetate or nitrate is substituted for the zinc chlorid, and barium acetate or nitrate is substituted for the barium chlorid, sodium acetate or nitrate, respectively, will be formed as the final solution instead of sodium chlorid.

The determination of the actual quantities of the materials used in the foregoing reactions resolves itself into a simple stoichiometric problem, based upon the atomic weights of the elements constituting any molecule, and as a commercial illustration of the formula contained in the first of the above reactions the following may be cited: I prepare separate aqueous solutions of the following ingredients in the proportions named, viz.: anhydrous zinc sulfate, one hundred and sixty-one (161) pounds; sodium hydrate, eighty (80) pounds; sodium carbonate, one hundred and six (106) pounds; barium sulfid, three hundred and thirty-eight (338) pounds. The zinc-sulfate and sodium-hydrate solutions are brought together when ninety-nine (99) pounds of zinc hydrate will be precipitated, and one hundred and forty-two (142) pounds of sodium sulfate will remain in solution. To the latter is added the sodium carbonate and then the barium sulfid, when two hundred and thirty-three (233) pounds of barium sulfate and one hundred and ninety-seven (197) pounds of barium carbonate will be precipitated and one hundred and fifty-six (156) pounds of sodium sulfid formed in the solution. The latter when evaporated crystallizing with nine molecules of water will form four hundred and eighty (480) pounds of sodium-sulfid crystals.

It is apparent, of course, that I may invoke the doctrine of chemical equivalents wherever the same are applicable.

Having described my invention, what I claim is—

1. The process of making pigment which consists in making a zinc-salt solution, with the hydrate and carbonate of an alkali metal, and a soluble salt of barium, and recovering the resulting precipitates, substantially as set forth.

2. The process of making pigment which consists in mixing a zinc-salt solution with the hydrate of an alkali metal, then adding the carbonate of an alkali metal and a soluble salt of barium, and recovering the resulting precipitates, substantially as set forth.

3. The process of making pigment which consists in mixing a zinc-salt solution with the hydrate of an alkali metal, then adding the carbonate of an alkali metal having the corresponding base, and a soluble salt of barium, and recovering and mixing the resulting precipitates, substantially as set forth.

4. The process of making pigment which consists in mixing a zinc-salt solution with the hydrate of sodium, then adding sodium carbonate, and a soluble salt of barium, and recovering and mixing the resulting precipitates, substantially as set forth.

5. The process of making pigment which consists in mixing a solution of zinc sulfate with the hydrate of an alkali metal, then adding the carbonate of an alkali metal having the corresponding base, then adding a soluble salt of barium, and recovering and mixing the resulting precipitates, substantially as set forth.

6. The process of making pigment which consists in mixing a solution of zinc sulfate with a solution of sodium hydrate, then adding respectively solutions of sodium carbonate and barium sulfid, and recovering and mixing the resulting precipitates, substantially as set forth.

In testimony whereof I affix my signature in presence of two witnesses.

WILLIAM J. ARMBRUSTER.

Witnesses:
EMIL STAREK,
G. L. BELFRY.